Oct. 4, 1966   G. WAGNER   3,276,161
FISH HOOK EXTRACTORS
Filed Aug. 21, 1964   2 Sheets-Sheet 1
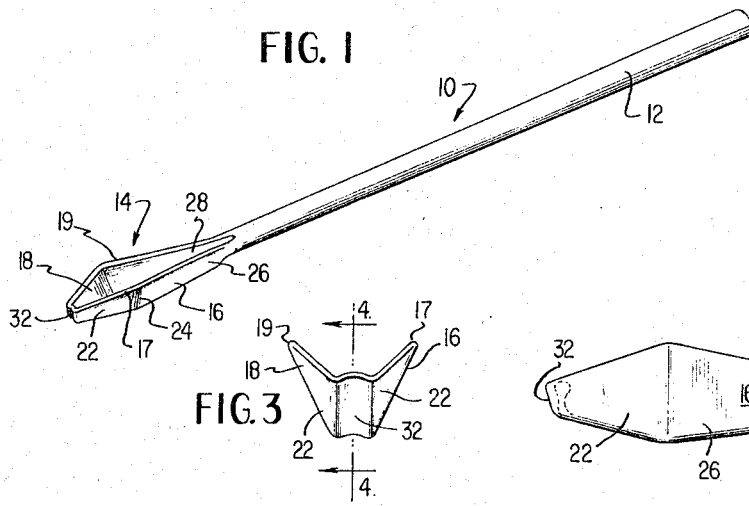
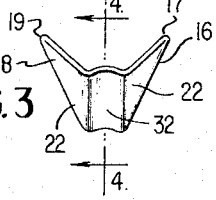
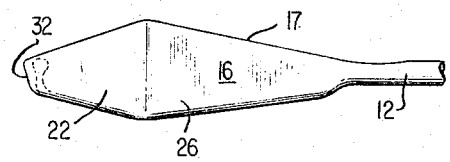
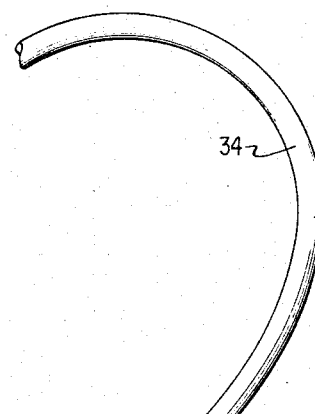
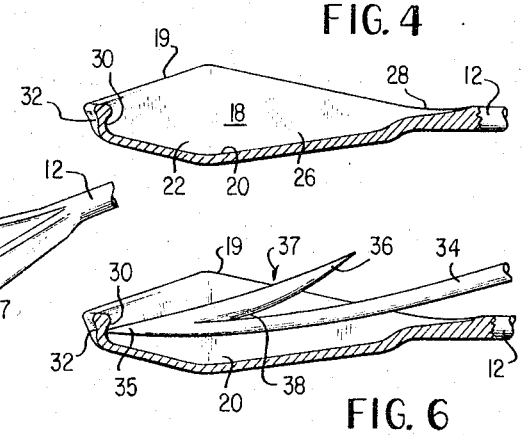
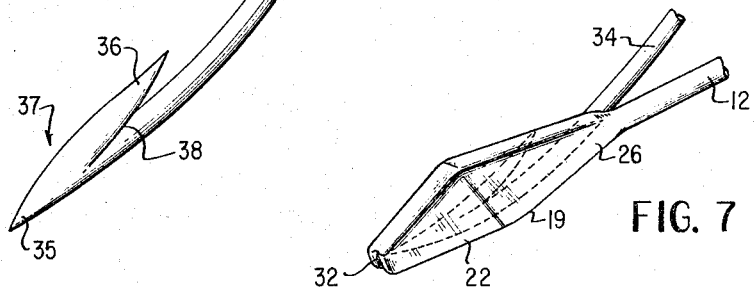
INVENTOR.
GLEN WAGNER
BY
*Jones, Birch, Swindler*
*& McKee*
ATTORNEYS.

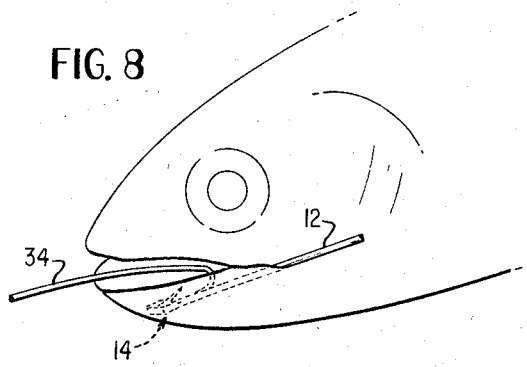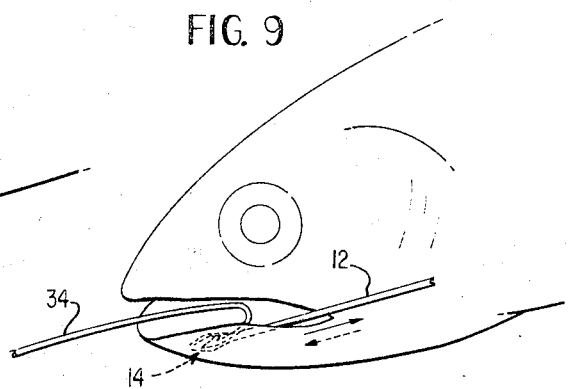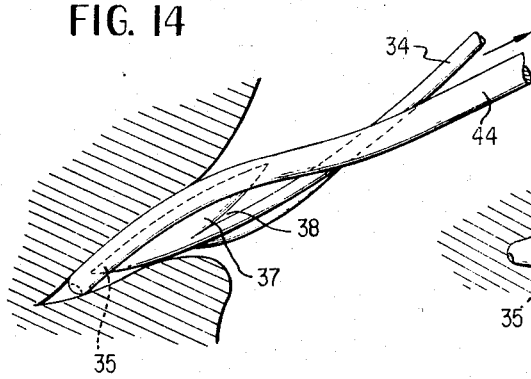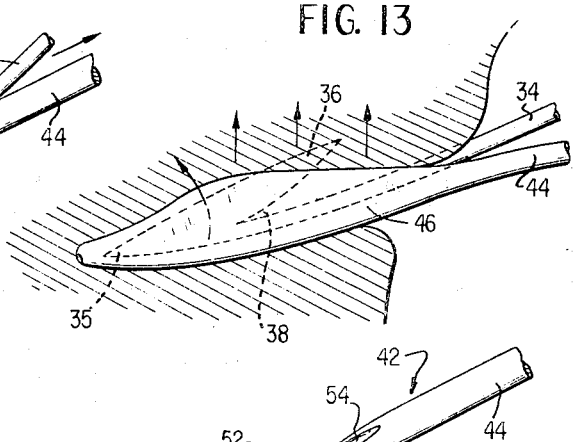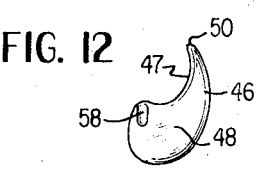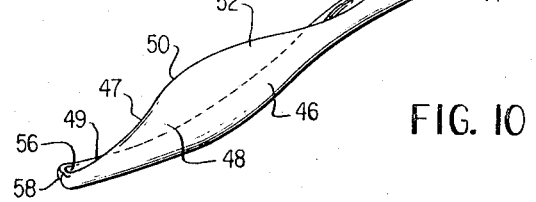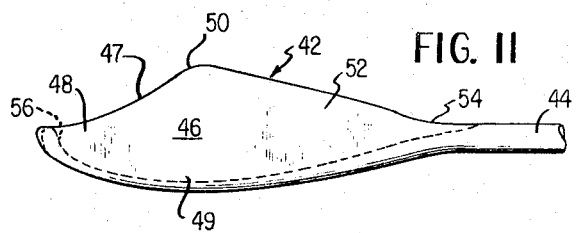
INVENTOR.
GLEN WAGNER

United States Patent Office 3,276,161
Patented Oct. 4, 1966

3,276,161
FISH HOOK EXTRACTORS
Glen Wagner, 115 5th Ave., Indialantic, Fla.
Filed Aug. 21, 1964, Ser. No. 391,197
5 Claims. (Cl. 43—53.5)

This invention relates to fish hook extractors and more particularly to fish hook extractors which dislodge tissue from a fish hook barb and allow the fish hook and extractor to be removed without further tearing of the tissue.

The ordinary fish hook has a barb on the inside surface of the hook. The barb catches tissue in its valley and prevents the withdrawal of the hook from the tissue thus insuring that once a fish has been caught on the hook, the fish cannot work itself loose. This type of hook has proved very effective and is by far the most common type of fish hook used.

On the other hand, the same feature of this hook which make it useful in preventing the fish from freeing itself of the hook, cause problems for the fishermen in removing the hook from the fish without spoiling the fish by tearing additional tissue. Normally, the fishermen will back the hook out of the tissue in the same direction in which it entered, tearing what ever tissue is caught in the valley of the barb of the hook.

This problem becomes even more acute when a fish hook is accidentally caught on a person or animal. Frequently, the only way in which the hook can be removed is to cut the hook back of its point with a pair of wire cutters and then force the hook forward through the tisue in which it is lodged, until it comes out. If an attempt is made to back the hook out, tissue caught in the valley of the barb of the hook will either prevent the removal of the hook or cause considerable pain as the tissue is torn when the hook is removed.

Various devices have been devised in the past for assisting in the removal of fish hooks from fish. These devices are generally concerned with preventing further tissue from catching on the barb and require that the tissue which is already caught in the valley of the barb be torn loose. Some attempts have also been made to provide fish hook removers which dislodge tissue from the valley of the barb but the use of these removers involves complex manipulations and hence, have proved unsatisfactory.

None of the devices presently available are acceptable in removing fish hooks from humans or animals.

It is therefore a primary object of this invention to provide a fish hook extractor which will remove a fish hook from tissue without tearing the tissue.

Another object of this invention is to provide a fish hook extractor which may be used to remove fish hooks from humans or animals.

Another object of this invention is to provide a fish hook extractor which can enter the opening made in tissue by the fish hook.

Still another object of this invention is to provide a fish hook extractor which can locate and snare the tip of a fish hook.

A further object of this invention is to provide a fish hook extractor which will urge tissue out of the valley of the barb of the fish hook and cover the barb to prevent further tissue from entering the valley.

Additional objects and advantages of this invention will become apparent from the following description and drawings.

The invention which accomplishes these objects and purposes may be described as an instrument for extracting fish hooks comprising: a handle located at the one end of said instrument; snare means located at the other end of said instrument for snaring the point of a fish hook; tissue dislodging means located to the rear of said snare means and connected to said handle for engaging tissue in the bottom of the valley of the barb of a fish hook and urging the tissue progressively out of the valley when said handle is rotated; and means located adjacent said tissue dislodging means for covering the point of the barb after tissue has been removed from the valley.

The instrument may have a guide located at the front end of the snare means to guide the instrument to the point of the hook. Preferably, the tissue dislodging means is the edge of a flange having a first portion which increases in height and flares outwardly from the front end of the flange to a point intermediate the ends of the flange for allowing easy insertion of the instrument into the opening in the tissue made by the fish hook and for urging tissue away from the body of the barb and a second portion which decreases in height and is directed inwardly from said first portion to the rearward end of such flange for engaging tissue in the valley of the barb and urging the tissue progressively out of the valley when the handle is rotated.

The instrument may have two such flanges joined in a longitudinal groove so that it may be rotated in either direction or it may have a single flange which is curved about the longitudinal axis of the instrument so that the instrument may be inserted with a minimum of difficulty and pain into the opening made by the point of the hook.

The invention having being generally described, the preferred specific embodiments will be discussed in detail with reference to the accompanied drawings.

FIGURE 1 is a perspective view of a fish hook extractor constructed in accordance with the teachings of this invention.

FIGURE 2 is a side elevation of a portion of the extractor of FIGURE 1.

FIGURE 3 is a front elevation of the extractor of FIGURE 1.

FIGURE 4 is a vertical section taken along line 4—4 of the extractor shown in FIGURE 3.

FIGURE 5 is a perspective view of a portion of the extractor of FIGURE 1 illustrating its use in conjunction with a fish hook.

FIGURE 6 is similar to FIGURE 4 and illustrates the position of the point of a fish hook after it has been snared.

FIGURE 7 is a perspective view of the extractor of FIGURE 1 showing the relative position of the hook and the extractor after the extractor has been rotated.

FIGURE 8 is a perspective view illustrating the extractor of FIGURE 1 in position to dislodge tissue from the valley of the barb of a fish hook in the mouth of a fish.

FIGURE 9 illustrates with withdrawal of a fish hook from the mouth of a fish using the extractor.

FIGURE 10 is a perspective view of another fish hook extractor constructed in accordance with the teachings of this invention.

FIGURE 11 is a side elevation of the extractor of FIGURE 10.

FIGURE 12 is a front elevation of the extractor of FIGURE 10.

FIGURE 13 illustrates the use of the extractor of FIGURE 10 to dislodge tissue from the valley of the barb of a fish hook.

FIGURE 14 illustrates the withdrawal of a fish hook from the tissue of a human being or animal using the extractor of FIGURE 10.

Referring now to the extractor illustrated in FIGURES 1–9, which may most advantageously be used to remove fish hooks from fish, it may be seen that the extractor, generally 10, has a handle or shank 12 at one end. A head, generally 14, is connected to the front end of handle 12. Head 14 has a pair of inclined flanges 16 and 18. The two flanges are joined at their bottoms in a longitudinal groove 20 in the center of the head and terminate at their tops in edges 17 and 19 respectively. Each of flanges 16 and 18 has a first portion 22 which increases in height and flares outwardly from the front end of the head 14 to a point 24 intermediate the ends of head 14 and a second portion 26 which decreases in height and is directed inwardly from the first portion 22 to the rearward end 28 of head 14. A snare or cup 30, which may have an opening in its center or may be closed as is illustrated, is located on the inside of the front end of head 14, and a groove forming a guide 32, is located on the outside of the front end of the cup.

To use the extractor, for removing a fish hook from the mouth of a fish, guide 32 of head 14 is engaged on the shank of the hook as is illustrated in FIGURE 5. By manipulating the jaws of the fish, the extractor 10 may easily be inserted in the mouth of the fish with handle 12 of the extractor extending out of the fish mouth in the direction of the fish body as is shown in FIGURE 8. The extractor is then urged along the shank of hook 34 and into the opening in the tissue of the fish made by the hook. The gradual increasing height of flanges 16 and 18 urges the tissue surrounding the shank of the hook upwardly and allows the easy insertion of the head of the extractor. When the front end of head 14 passes over point 35 of hook 34 the user can sense that the head has passed point 35 and pulls back slightly on the extractor 10 to snare point 35 in a cup 30 as is illustrated in FIGURES 6 and 8.

The user then rotates the extractor slowly, either clockwise or counterclockwise, through about 180°. As the extractor is rotated, for example in the clockwise direction, the edge of first portion 22 of flange 16 urges the tissue away from body 36 of barb 37, and the edge of second portion 26 of flange 16 engages the tissue in the bottom of barb valley 38 and gradually urges the tissue out of the valley.

Desirably first portion 22 of flanges 16 and 18 is not as long as the distance of the fish hook from point 35 to barb valley 38, so that first portion 22 will engage the body of barb 37 before second portion 26 begins to urge the tissue out of valley 38.

When the full approximate 180° rotation is completed, the tissue has been urged completely off of the body of the barb and out of the valley of the barb as shown in FIGURE 7. At this point the barb is located in groove 20 of head 14 and it is protected from engaging any further tissue. The hook may now be removed from the tissue by simply withdrawing the handle 12 of extractor as shown in FIGURE 9.

Referring now to the embodiment illustrated in FIGURES 10–14, it may be seen that extractor 42 has a handle 44 at one end and a flange 46 on the other end. The flange has a first portion 48 which increases in height and flares outwardly from the front end of the flange to a point 50, intermediate the end of the flange and a second portion 52 which decreases in height and is directed inwardly from the first portion 48 to the rearward end 54 of flange 46. Flange 48 terminates in a groove 49 at its bottom and in an edge 47 at its top. A cup 56 is located on the inside of the front end of the flange and a guide 58 is located on the outside of the front end of the flange.

This embodiment is particularly adapted to remove fish hooks from humans or animals. Desirably it is as small as possible, being only slightly larger than the fish hook itself. Further, it has one flange which is curved so that the extractor may be inserted into the small opening in the tissue made by the fish hook without tearing or substantial increased pressure on the tissue.

The use of this instrument is substantially the same as the first embodiment. Guide 58 is first engaged on the shank of the fish hook 34 and is slid along the shank until the forward edge of the flange passes over the end of point 35 of the hook. The extractor is then pulled backwards slightly to snare the point of the hook in cup 56. Then, as is illustrated in FIGURES 13 and 14, the extractor is rotated gradually in a clockwise direction through about 180°. As the extractor is rotated, the upper edge of first portion 48 of flange 46 engages the tissue on the barb and begins to urge it therefrom. As the extractor is further rotated, the upper edge of second portion 52 of flange 46 engages the tissue in the bottom of the valley of the barb 38 and urges the tissue progressively out of the valley. After the tissue has been urged off of the body of the barb and out of the valley, the rotation of the extractor is continued until barb 37 is located in groove 49. In this position the barb is completely covered by the extractor and cannot engage further tissue. The extractor with the hook snared therein may then be removed from the tissue merely by withdrawing the extractor.

While the two embodiments of this invention discussed above have been described with particular reference to their preferred use, it will be readily appreciated that either embodiment could if necessary be used to remove hooks from either fish, or humans and animals.

There has been illustrated and described what are considered to be preferred specific embodiments of the invention. It will be understood, however, that various modifications and variations of this invention will become readily apparent to those skilled in the art without departing from the scope of the invention which is defined in the appended claims.

I claim:

1. An instrument for extracting fish hooks comprising: a shank; a cup on one end of said shank for snaring the point of the hook, said cup having a groove on the outside of its front end to form a guide for guiding the instrument along the hook to the point; and a head having a pair of flanges joined in a longitudinal groove in the center of said head for covering the barb of the hook after tissue has been removed from the valley of the barb, each of said flanges having a first portion which increases in height and flares outwardly from the front end of said head to a point intermediate the ends of said head for allowing easy insertion of the instrument into the opening in the tissue made by the fish hook and for urging tissue off of the body of the barb when said shank is rotated, and a second portion which decreases in height and is directed inwardly from said first portion to the rearward end of said head for engaging tissue in the valley of the barb and urging the tissue progressively out of the valley when said handle is rotated.

2. An instrument for extracting fish hooks comprising: a shank; a flange mounted on one end of said shank, said flange being curved about the longitudinal axis of the instrument and having a first portion which increases in height from the front end of said flange to a point intermediate the ends of said flange for allowing easy insertion of the instrument into the opening made in the tissue by the fish hook and for urging tissue off of the body of the barb, and a second portion which decreases in height and is directed inwardly from said first portion to the rearward end of said flange for engaging tissue in the valley of the barb and urging the tissue progressively out of the valley when said handle is rotated; a cup at the front end of said flange for snaring the point of the hook; and a groove formed in the outside of the front end of said cup for guiding the instrument to the point of the hook.

3. An instrument for extracting fish hooks comprising: a handle located at one end of said instrument; snare means located at the front end of said instrument for snaring the point of a fish hook; tissue dislodging means located to the rear of said snare means and connected to said handle, said tissue dislodging means comprising the edge of a flange; said flange having a first portion which increases in height and flares outwardly from the front end of said flange to a point intermediate the ends of said flange for allowing easy insertion of the instrument into the opening made in the tissue by the fish hook and for urging tissue off of the body of the barb, and a second portion which decreases in height and is directed inwardly from said first portion to the rearward end of said flange for urging the tissue progressively out of the valley of the barb when said handle is rotated; and means located adjacent said tissue dislodging means for covering the point of the barb after tissue has been removed from the valley.

4. The instrument of claim 3 wherein said flange is curved about the longitudinal axis of said instrument whereby the instrument may be inserted with a minimum of difficulty and pain into the opening made by the point of the hook.

5. An instrument for extracting fish hooks comprising: a handle located at one end of said instrument; snare means located at the front end of said instrument for snaring the point of a fish hook; tissue dislodging means located to the rear of said snare means and connected to said handle, said tissue dislodging means comprising a head; said head having a pair of flanges joined in a longitudinal groove in the center of said head, each of said flanges having a first portion which increases in height and flares outwardly from the front end of said head to a point intermediate the ends of said head for allowing easy insertion of the instrument into the opening in the tissue made by the fish hook and for urging tissue off of the body of the barb when said handle is rotated, and a second portion which decreases in height and is directed inwardly from said first portion to the rearward end of said head for engaging tissue in the valley of the barb and urging the tissue progressively out of the valley when said handle is rotated; and means located adjacent said tissue dislodging means for covering the point of the barb after tissue has been removed from the valley.

References Cited by the Examiner

UNITED STATES PATENTS

| 2,502,793 | 4/1950 | Kinney | 43—53.5 |
| 2,561,281 | 7/1951 | Lawrence | 43—53.5 |
| 2,777,244 | 1/1957 | McKinley | 43—53.5 |

SAMUEL KOREN, *Primary Examiner.*

W. H. CAMP, *Assistant Examiner.*